United States Patent [19]
Shih

[11] Patent Number: 5,321,110
[45] Date of Patent: Jun. 14, 1994

[54] CATIONIC POLYMER COMPOSITIONS

[75] Inventor: Jenn S. Shih, Paramus, N.J.

[73] Assignee: ISP Investments Inc., Wilmington, Del.

[21] Appl. No.: 906,163

[22] Filed: Jun. 29, 1992

[51] Int. Cl.$^5$ .................. C08F 226/10; C08F 226/02; C08F 220/56; C08F 220/04; C08F 220/10; C08F 220/06

[52] U.S. Cl. .................. 526/264; 526/307.3; 526/307.6; 526/310; 526/317.1; 526/318.2; 526/328.5

[58] Field of Search .................. 526/264, 307.3, 307.6, 526/310, 317.1, 318.2, 328.5

[56] References Cited

U.S. PATENT DOCUMENTS

| | | | |
|---|---|---|---|
| 3,910,862 | 10/1975 | Barabas et al. | 526/264 |
| 3,933,766 | 1/1976 | Hofmann et al. | 526/264 |
| 5,153,289 | 10/1992 | Schulz et al. | 526/264 |

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

What is provided herein are cationic polymer compositions comprising a cationic polymer of strongly swellable, moderately crosslinked vinyl lactam, e.g. vinylpyrrolidone, and a quaternized amino alkyl acrylamido or acrylate, e.g. quaternized dimethylaminopropyl methacrylamide or dimethylaminoethyl methacrylate, optionally including a polymerizable carboxylic acid, e.g. acrylic acid or methacrylic acid, which includes about 0.1–0.8% of a crosslinking agent therein. These polymer compositions, in a concentration of 1–10% by weight in aqueous and non-aqueous medium, provide effective thickener action while imparting cationic characteristics to the resulting solution.

20 Claims, 2 Drawing Sheets

CATIONIC POLYMER COMPOSITIONS

BACKGROUND OF THE INVENTION

1. Field of the Invention

This invention relates to polymer compositions, and, more particularly, to cationic polymer compositions which include polymers of a strongly swellable, moderately crosslinked vinyl lactam, such as vinylpyrrolidone (VP) and a quaternized amino alkyl acrylamide or acrylate, e.g. quaternized dimethylaminopropyl methacrylamide (DMAPMAA), or quaternized dimethylaminoethyl methacrylate (DMAEMA), optionally, including a polymerizable carboxylic acid, and to aqueous and non-aqueous solutions of such polymers.

2. Description of the Prior Art

Shih, in U.S. Pat. No. 4,923,694, disclosed a stable, non-irritating hair care composition having conditioner action comprising an aqueous solution containing a copolymer of vinylpyrrolidone and (3-methacrylamidopropyl) trimethylammonium chloride. These products were described as useful hair spray resins, as viscosity builders for cosmetic creams and lotions, and as hair and skin conditioners.

Shih, in U.S. Pat. No. 5,073,614, disclosed the preparation of strongly swellable, moderately crosslinked polyvinylpyrrolidone polymers in the form of fine white powders of defined gel volume and Brookfield viscosity which were prepared by direct precipitation polymerization in an organic solvent in the presence of about 0.2–1% by weight of vinylpyrrolidone of a multifunctional crosslinking agent.

Accordingly, it is an object of this invention to provide a new and useful cationic polymer compositions which provide aqueous and non-aqueous cationic polymer solutions having effective thickener action while imparting cationic characteristics to the resulting solution at a predetermined concentration of said polymer therein.

A specific object of the invention is to provide a predetermined amount of crosslinking agent in a cationic polymer whereby an effective cationic thickener product can be obtained.

SUMMARY OF THE INVENTION

What is provided herein are cationic polymer compositions of a cationic polymer of 50–99 mole % a strongly swellable, moderately crosslinked vinyl lactam, e.g. vinylpyrrolidone, and 1–50 mole % of a quaternized amino alkyl acrylamide, e.g. quaternized dimethylaminopropyl methacrylamide, and which includes about 0.1–0.8% of a crosslinking agent therein. These cationic polymer compositions effectively thicken both aqueous and non-aqueous solutions at a concentration of 1–10% by weight of the polymer while imparting cationic characteristics to the resulting product.

IN THE DRAWINGS

FIG. 1 is a graphical representation of Brookfield viscosity and gel volume vs. at a concentration of 4% by weight crosslinker for an aqueous cationic polymer composition of a cationic polymer composition of 79 weight % of strongly swellable, moderately crosslinked vinylpyrrolidone (VP) crosslinked with triallyl-1,3,5-triazine-2,4,6(1H,3H,5H)-trione (TATT), and 19 weight % of quaternized dimethylaminopropyl methacrylamide (DMAPMAA), and 2 weight % acrylic acid, at a 4% by weight level.

FIG. 2 is a graphical representation of Brookfield viscosity vs. aqueous concentration for the cationic polymer composition of FIG. 1 at a 0.45% TATT level.

DETAILED DESCRIPTION OF THE INVENTION

Figure 1:
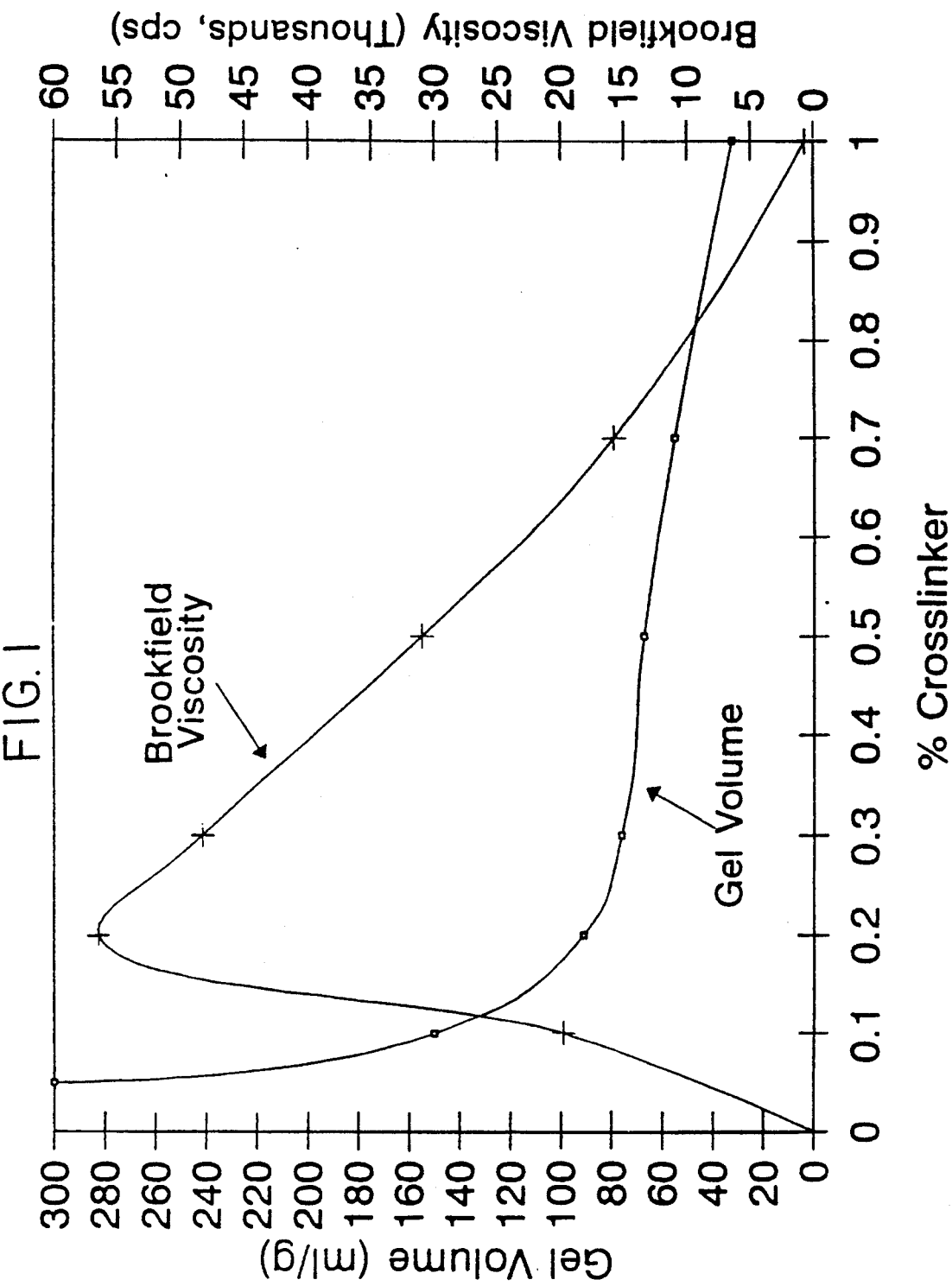

The cationic (quaternized) polymer product has the formula:

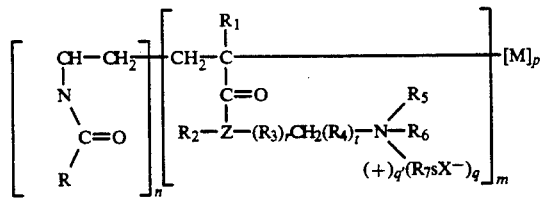

where R is alkylene having from 3 to 8 carbon atoms optionally substituted with lower alkyl; $R_1$ and $R_2$ are each independently hydrogen or methyl; $R_3$ and $R_4$ are each alkylene having from 1 to 18 carbon atoms optionally substituted with alkyl; the sum of r and t is one or zero; $R_5$ and $R_6$ are each independently lower alkyl; Z is oxygen or nitrogen; if oxygen, $R_2$ is absent; M is a polymerizable carboxylic acid; n has a value of from 1 to 99 mole %; m has a value of from 1 to 99 mole %; p has a value of from 0 to 98 mole %; the sum of m+n+p is 100; preferably, n is 50 to 90 mole %; m is 7 to 25 mole % and p 3 to 25 mole %; $R_7sX^-$ is a quaternizing group, in which $R_7$ is lower alkyl, pyrrolidonyl alkyl, carboxymethylene, or a zwitterion of $\beta$-propiolactone; X is an anion derived from the group of halogen, $SO_3$, $SO_4$, $HSO_4$ and $R_7SO_4$; and s is the reciprocal of the number of negative charges in X; and q and q' ranges from 0.01 to 1, wherein the polymer includes from 1 to 100% of a quaternized form of monomer; and 0.1–0.8% by weight of the polymer of a crosslinking agent.

The powdery quaternized polymers of the invention thus comprise:

(a) a strongly swellable, moderately crosslinked vinyl lactam, such as vinyl pyrrolidone (VP) or vinyl caprolactam (VC); with 0.1–0.8% of a crosslinking agent therein;

(b) an amino alkyl acrylamide or acrylate, such as dimethylaminopropyl methacrylamide (DMAPMA) or dimethylaminoethyl methacrylate (DMAEMA); and, optionally, (c) a polymerizable carboxylic acid, such as acrylic acid (AA) or methacrylic acid (MMA).

The powdery cationic polymers of the invention are made by precipitation polymerization in a non-aqueous solvent, particularly, a non-polar organic solvent cyclic or acyclic aliphatic hydrocarbon such as heptane or cyclohexane, an aromatic solvent such as benzene or toluene, an ether such as methyl tertiary butyl ether, or a ketone, such as acetone or methyl ethyl ketone. Both the polymer formation and quaternization steps are carried out in a heterogeneous medium in a non-polar solvent.

These powdery quaternized polymers find particular application as cationic thickening agents in cosmetic preparations, such as shampoo and hair conditioner products, and as controlled release or bioadhesive agents.

The powdery cationic polymers thus are prepared by the steps of:

(1) precipitation polymerization in a non-polar organic solvent of (a) a vinyl lactam, (b) an amino alkyl acrylamide or acrylate, and, optionally, (c) a polymerizable carboxylic acid; with 0.1–0.8% by weight of a crosslinking agent, (2) quaternization with a quaternizing agent, such as an alkyl halide, a dialkyl sulfate, chloroacetic acid, p-propiolactone, or chloromethyl pyrrolidone; and (3) recovering the powdery quaternized polymer product.

Suitable vinyl lactam monomers for use herein have the formula:

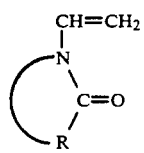

where R is as defined above.

Representative vinyl lactams include:
N-vinyl pyrrolidone
N-vinyl caprolactam
N-vinyl piperidone
4-methyl-N-vinyl pyrrolidone
3,5-dimethyl-N-vinyl caprolactam
N-vinyl-hexahydro-2-azepinone
N-vinyl-octahydro-2-azocinone
N-vinyl octahydro-2-azoninone and
N-vinyl decahydro-2-azecinone.

Of these, N-vinyl pyrrolidone, N-vinyl caprolactam and the ring substituted alkyl derivatives of the N-vinyl caprolactam and N-vinyl pyrrolidone monomers are preferred. N-vinyl-2-pyrrolidone is most preferred.

Suitable amino alkyl acrylamide monomers useful in preparing the terpolymers of the present invention include amino alkyl acrylamides and methacrylamides of the general formula:

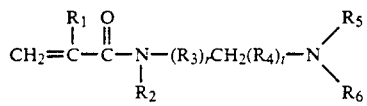

where $R_1$, $R_2$, $R_3$, r, $R_4$, t, $R_5$ and $R_6$ are as defined above.

Examples of amino alkyl acrylamides which are employed as monomers herein include:
N-[3-(dimethylamino) propyl]methacrylamide (DMAPMA)
N-[12-(dimethylamino) dodecyl]methacrylamide
N-[18-(dimethylamino) octadecyl]methacrylamide
N-[8-(dimethylamino) octyl]methacrylamide
N-[7-(dimethylamino) heptyl]acrylamide
N-[14-(dimethylamino) tetradecyl]acrylamide
N-[3-(dimethylamino) propyl]methacrylamide
N-[3-(diethylamino) propyl]acrylamide
N-(4-(dipropylamino) butyl]methacrylamide
N-[3-(methyl butyl amino) propyl]acrylamide
N-(2-[3-(dimethylamino) propyl]ethyl)acrylamide
N-(4-[4-(diethylamino) butyl]butyl)acrylamide.

Amino alkyl acrylate monomers useful in preparing the terpolymers of the invention have the formula:

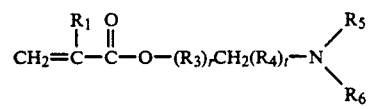

where $R_1$, $R_3$, r, $R_4$, t, $R_5$ and $R_6$ are as defined above.

Exemplary amino alkyl acrylates or methacrylates suitably employed in the production of the terpolymers of the present invention include:
dimethylaminomethyl acrylate
dimethylaminomethyl methacrylate
diethylaminomethyl acrylate
diethylaminomethyl methacrylate
dimethylaminoethyl acrylate
dimethylaminoethyl methacrylate (DMAEMA)
dimethylaminobutyl acrylate
dimethylaminobutyl methacrylate
dimethylaminoamyl methacrylate
diethylaminoamyl methacrylate
dimethylaminohexyl acrylate
diethylaminohexyl methacrylate
dimethylaminooctyl acrylate
dimethylaminooctyl methacrylate
diethylaminooctyl acrylate
diethylaminooctyl methacrylate
dimethylaminodecyl methacrylate
dimethylaminododecyl methacrylate
diethylaminolauryl acrylate
diethylaminolauryl methacrylate
dimethylaminostearyl acrylate
dimethylaminostearyl methacrylate
diethylaminostearyl acrylate
diethylaminostearyl methacrylate.

Suitable polymerizable carboxylic acid monomers for use herein include:
acrylic acid
methacrylic acid
maleic acid
itaconic acid
3-phenyl-2-propenic acid
crotonic acid and
fumaric acid.

Suitable crosslinking agents for use in the invention include such multifunctional compounds as the divinyl ethers of an aliphatic diol, e.g. the divinyl ethers of 1,3-propanediol, 1,4-butanediol, 1,5-pentanediol, 1,6-hexanediol, 1,7-heptanediol, 1,8-octanediol, 1,9-nonanediol, 1,10-decanediol, 1,11-unidecanediol, and 1,12-dodecanediol; as well as the divinyl ethers of diethylene glycol, triethylene glycol, tetraethylene glycol, pentaethylene glycol, hexaethylene glycol, heptaethylene glycol, octaethylene glycol, nonaethylene glycol, decaethylene glycol and further polyalkylene glycols up to a molecular weight of about 6000. Other suitable crosslinking agents include 1,7-octadiene, 1,9-decadiene, 1,13-tetradecadiene, divinylbenzene, N-N'-divinylimidazolidone, and methylene bisacrylamide; acrylates such as polyethylene glycol diacrylate, trimethylolpropane triacrylate, propylene glycol diacrylate; allyl ether derivatives of polyhydric alcohols such as pentaerythritol triallyl ether; or polyhdyric alcohols esterified once or twice with acrylic acid; triallylamine, tetraallylethylene diamine, diallyl phthalate, and the like. Preferred crosslinking agents are the following: N,N'-divinylimidazolidone, pentaerythritol triallyl ether, triallyl-1,3,5-triazine-2,4,6(1H,3H,5H)-trione and 2,4,6-triallyloxy-1,3,5triazine.

The powdery quaternized polymers of the present invention are conveniently prepared by subjecting a solution of (a) the vinyl lactam, preferably vinyl pyrrolidone, (b) the amino alkyl acrylamide or acrylate monomer, optionally, (c) and the polymerizable carboxylic acid monomer, preferably acrylic acid, and (d) crosslinking agent to conditions conducive to polymerization through double bonds. Thus, for example, the reaction can be suitably initiated by the action of free radicals, polymerization proceeding exothermically once initiated. Suitable free radical initiators conveniently employed and suitably utilized in accordance with the production of the copolymers of the present invention include organic and inorganic peroxide and perester compounds e.g., hydrogen peroxide, lauryl peroxide, decanoyl peroxide, di-tert-butyl peroxide, tert-butyl peroxypivalate, etc., aliphatic azo compounds, e.g., azobisisobutyronitrile, as well as other free radical initiators well known in the polymerization art.

The polymerization reaction of the present invention takes place in the presence of a solvent. In this invention, precipitation polymerization is employed to provide the quaternized polymer in powder form. Suitable solvents for this use are non-polar organic solvents, preferably cyclic or acyclic, such as aliphatic hydrocarbons, such as hexane, heptane and cyclohexane. Heptane and cyclohexane are preferred. Both the formation of the polymer and the quaternization of the powdery polymer to form a powdery quaternized polymer, are carried out heterogeneously.

The precipitation polymerization reaction is effected at a temperature between about 40° C. and about 130° C. under from about 14 to about 50 psia. for a period of from about 1 to about 20 hours. To avoid run away conditions and to obtain a polymer of a desirable high molecular weight it is preferred to carry out the polymerization at the lower end of the temperature range, e.g. between about 50° C. and about 80° C. The polymerization reaction is preferably carried out in the absence of free oxygen, conveniently under a blanket of an inert gas, such as nitrogen, argon or the like, and at atmospheric pressure.

The polymers of the invention can be made by precipitation polymerization within the complete compositional range of monomer components. Accordingly, the polymers can be formed from 1-99% by weight of each of the monomer components; preferably (a) 50 to 90%; (b) 10 to 50%; and (c) 0-15%.

In the preparation of the powdery quaternized polymers of the present invention, it is only necessary to mix the monomers in the ratios set forth above in order to provide a polymer product produced through vinyl polymerization initiated by the action of free radicals. Generally, the polymer is produced within a period of a few hours, e.g. less than about 10 hours. The feeding rates of the VP and DMAPMA monomers, for example, which may be added separately or in admixture, suitably is about 0.1 ml/min/kg solvent to 1.0 ml/min/kg solvent, preferably 0.4-0.7 ml/min/kg solvent; and the polymerizable carboxylic acid and crosslinking agent are added during the same period of time.

The present cationic polymeric products are particularly useful as viscosity builders for cosmetic creams and lotions as well as for such hair treatment compositions to provide body and retentative moisturizing. When incorporated into standard formulations such as hair sprays, hair setting lotions, shampoos, hair and skin conditioners, and other personal care products, the amount of polymeric product used can range between about 0.05 weight % and about 8 weight %, based on total formulation. Usually not more than 4% is required to achieve the above desirable affects. The present powdery quaternized polymer or polymer mixture may be conveniently added to the cosmetic formulations as the powder itself, or as an aqueous or non-aqueous solution containing from about 1% to about 10% of polymer.

The invention will now be described with reference to the following examples.

EXAMPLE 1

In a 2-liter, four-necked reaction kettle (bottom radius=5 and ⅛ inches) equipped with a condenser, a constant speed (set at 170 rpm) mechanical stirrer with torque reading and anchor agitator (open radius=4 and 5/6 inches), a dip tube connected to metering pump, a nitrogen purge adaptor, and a thermocouple connected to the temperature controller, 1000 grams of heptane were charged and the reactor was heated to 65° C. in 30 minutes with nitrogen purge throughout the whole process. Hold the reactor at 65° C. in 30 minutes. Add 520 microliters of t-butylperoxypivalate (Lupersol 11) into the reactor and feed the solution of VP, DMAPMAA and desired amount of crosslinking agent into reactor at a rate of 0.60 ml/min. A total of 2 g. of acrylic acid then was added in equal amounts every 15 minutes for 6 hours. After VP and DMAPMAA were fed completely, the mixture was kept stirring at 65° C. for overnight. Then, the reactor was heated to 85° C., over half hour and held another half hour. Charged 200 microliters of t-butylperoxypivalate at every hour for 4 hours at 85° C. Cooled the reactor to 40° C. and added 18.12 grams of diethyl sulfate to completely quaternize the DMAPMAA. The reaction was run for 4 hours at 40° C. and was cooled to room temperature and the mixture was poured into a pan. The polymer was dried in the oven (100° C.), and vacuum oven (90° C.) for 16 hours each.

EXAMPLE 2

In a 2-liter, four necked reaction kettle (bottom radius=5 and ⅛ inches) equipped with a condenser, a constant speed (set at 170 rpm) mechanical stirrer with torque reading and anchor agitator (open radius=4 and 5/6 inches), a dip tube connected to metering pump, a nitrogen purge adaptor, and a thermocouple connected to the temperature controller, 1000 grams of heptane were charged and the reactor was heated to 65° C. in 30 minutes with nitrogen purge throughout the whole process. Hold the reactor at 65° C. for 30 minutes. Add 520 microliters of t-butylperoxypivalate (Lupersol 11) into the reactor and feed the solution of VP, DMAPMA and desired amount of crosslinking agent into reactor at a rate of 0.60 ml/min. A total of 2 g. of acrylic acid was added in equal amounts every 15 minutes for 6 hours. After VP and DMAPMA were fed completely, the mixture was kept stirring at 65° C. for one hour. The mixture was transferred to a 2-liter stainless high pressure reactor and purged with nitrogen. The reactor was sealed and heated to 130° C. The reaction was held at 130° C. for 8 hours. Cooled the reactor to 40° C. and added 18.12 grams of diethyl sulfate to completely quaternize the DMAPMA. The reaction was run for 4 hours at 40° C. and was cooled to room temperature and the mixture was poured into a pan. The polymer was dried in the oven (100° C.), and vacuum oven (90° C.) for 16 hours each.

was poured into a pan. The polymer was dried in the oven (100° C.), and vacuum oven (90° C.) for 16 hours each.

TABLE 1

STRONGLY SWELLABLE, MODERATELY CROSSLINKED CATIONIC POLYMERS

| Ex. | VP (g) | DMAPMA (g) | AA (g) | Crosslinker | Amount of Crosslinker (% wt) | Quaternizing Agent (g) | Yield (%) |
|---|---|---|---|---|---|---|---|
| 4 | 80 | 20 | 2 | TATT | 0.45 | DES (18.2) | 96 |
| 5 | 80 | 20 | 2 | TATT | 1.0 | DES (18.2) | 95 |
| 6 | 80 | 20 | 2 | TATT | 0.7 | DES (18.2) | 94 |
| 7 | 80 | 20 | 2 | TATT | 0.3 | DES (18.2) | 97 |
| 8 | 80 | 20 | 2 | TATT | 0.4 | DES (18.2) | 96 |
| 9 | 80 | 20 | 2 | TATT | 0.5 | DES (18.2) | 95 |
| 10 | 80 | 20 | 2 | TATT | 0.6 | DES (18.2) | 94 |
| 11 | 80 | 20 | 2 | TATT | 0.2 | DES (18.2) | 93 |
| 12 | 80 | 20 | 2 | DVI | 0.45 | DES (18.2) | 98 |
| 13 | 80 | 20 | 2 | DVI | 0.3 | DES (18.2) | 96 |
| 14 | 80 | 20 | 2 | DVI | 0.7 | DES (18.2) | 95 |
| 15 | 80 | 20 | 2 | PETA | 0.45 | DES (18.2) | 96 |
| 16 | 80 | 20 | 2 | PETA | 0.3 | DES (18.2) | 97 |
| 17 | 80 | 20 | 2 | PETA | 0.7 | DES (18.2) | 95 |
| 18 | 80 | 20 | 8.5 | TATT | 0.6 | DES (18.2) | 95 |
| 19 | 80 | 20 | 5.0 | TATT | 0.3 | DES (9.1) | 97 |
| 20 | 80 | 20 | 0 | TATT | 0.45 | DES (18.2) | 94 |
| 21 | 80 | 30 | 2 | TATT | 0.6 | DES (27.3) | 93 |
| 22 | 80 | 20 | 40 | TATT | 0.45 | DES (9.1) | 94 |

VP - Vinylpyrrolidone
DMAPMAA - dimethylaminopropyl methacrylate
AA - acrylic acid
TATT - triallyl-1,3,5-triazine-2,4,6(1H,3H,5H)-trione
DVI - N,N'divinylimidazolidone
PETA - petaerythritol triallyl ether
DES - diethyl sulfate
DMAEMA - dimethylaminoethyl methacrylate
MA - methacrylic acid

TABLE 2

| Ex. | VP (g) | DMAPMA (g) | AA or MA (g) | Crosslinker | Amount of Crosslinker (% wt) | Quaternizing Agent (g) | Yield (%) |
|---|---|---|---|---|---|---|---|
| 23 | 80 | 20 | AA (2) | TATT | 0.5 | DES (18.2) | 96 |
| 24 | 80 | 20 | MA (2) | TATT | 0.5 | DES (9.1) | 97 |
| 25 | 80 | 20 | AA (2) | DVI | 0.5 | DES (18.2) | 95 |
| 26 | 80 | 20 | AA (2) | PETA | 0.5 | DES (18.2) | 94 |
| 27 | 80 | 20 | MA (2) | DVI | 0.5 | DES (18.2) | 96 |
| 28 | 80 | 20 | MA (2) | PETA | 0.5 | DES (9.1) | 94 |

EXAMPLE 3

In a 2-liter, four necked reaction kettle (bottom radius = 5 and ⅛ inches) equipped with a condenser, a constant speed (set at 170 rpm) mechanical stirrer with torque reading and anchor agitator (open radius = 4 and 5/6 inches), a dip tube connected to metering pump, a nitrogen purge adaptor, and a thermocouple connected to the temperature controller, 1000 grams of heptane were charged and the reactor was heated to 65° C. in 30 minutes with nitrogen purge throughout the whole process. Hold the reactor at 65° C. for 30 minutes. Add 520 microliters of t-butylperoxypivalate (Lupersol 11) into the reactor and feed the solution of VP, DMAPMA and desired amount of crosslinking agent into reactor at a rate of 0.60 ml/min. A total of 10 g. of acrylic acid was added in equal amounts every 15 minutes for 6 hours. After VP and DMAPMA were fed completely, the mixture was kept stirring at 65° C. overnight. Then, the reactor was heated to 85° C. over half hour and hold another half hour. Charged 200 microliters of t-butylperoxypivalate at every hour for 4 hours at 85° C. Cooled the reactor to 40° C. and added 18.12 grams of diethyl sulfate to completely quaternize the DMAPMA. The reaction was run for 4 hours at 40° C. and was cooled to room temperature and the mixture Properties of Polymer of Invention The strongly swellable, moderately crosslinked polymer powders of the invention in suitable aqueous or non-aqueous solution are characterized by its unique gel volume and viscosity, which properties enable the polymer to thicken aqueous and non-aqueous solutions effectively.

Gel volume is a measure of the swelling property of the crosslinked polymer and is defined as the equilibrium aqueous swelling volume of polymer per unit weight, and is expressed in the units of ml/g. Gel volume is determined by first adding 1 g. of the polymer to a suitable graduated cylinder filled with water. This mixture then is shaken and allowed to stand at room temperature for 3 days. The volume of the gel which is produced in water is measured and taken as the gel volume. Similarly, the gel volume concept can be applied to non-aqueous systems.

The viscosity of the polymer is defined by its Brookfield viscosity in cps, which is determined upon a 4% aqueous solution of the polymer at 25° C. by a standard analytical procedure using Model RTV and Spindle No. 4.

Referring now to FIG. 1, there is shown the Brookfield viscosity and gel volume parameters vs. % crosslinker for an aqueous solution of the cationic polymers of the invention. For maximum utility, it is desirable that the hydrated polymer exhibit a high gel volume and a high viscosity. With increasing crosslinking density in the polymer, the gel volume decreases and viscosity increases and then decreases, passing through a maximum. In the crosslinked polymer system of this invention, an effective thickener product is provided by including crosslinker in the reaction mixture at a suitable concentration of about 0.1 to 0.8% by weight, based upon VP, preferably about 0.2 to 0.6%. At this suitable amount of crosslinker loading, the crosslinked polymer product exhibits a gel volume of about 50 to 150 ml/g of polymer and a Brookfield viscosity of at least 10,000 cps. At the preferred crosslinker concentration, the gel volume is about 70 to 90 ml/g of polymer and its Brookfield viscosity is at least 23,000 cps. At the optimal amount crosslinker present in the reaction mixture of 0.25%, the polymer exhibits a gel volume of about 85 ml/g of polymer and a Brookfield viscosity of about 57,000 cps.

Figure 2:
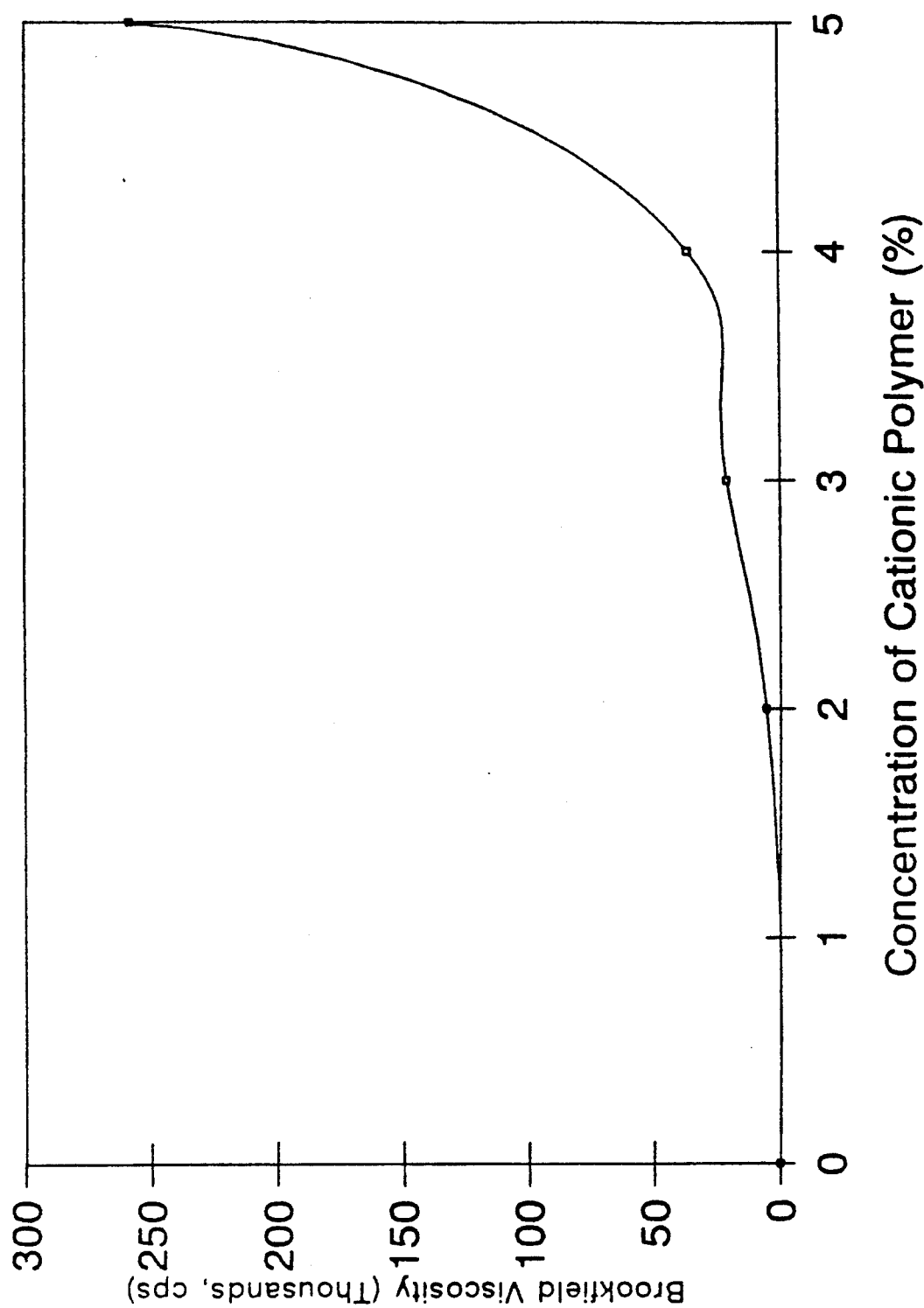

FIG. 2 shows the effect of polymer conentration in aqueous solution upon Brookfield viscosity at a 0.45% crosslinker level. Suitably, the polymer concentration is 1-10% by weight of the solution preferably about 2-8%. The viscosity increases dramatically above 4%.

As an added feature of the invention, the residual VP monomer content of the polymers obtained herein is less than about 0.1% by weight. In aqueous based processes, in contrast, the formation of a gel mass during polymerization may trap considerable amounts of VP monomer in the polymeric gel network.

While the invention has been described with particular reference to certain embodiments thereof, it will be understood that changes and modifications may be made which are within the skill of the art. Accordingly, it is intended to be bound only by the following claims.

What is claimed is:

1. Strongly swellable, moderately crosslinked, powdery quaternized vinyl lactam polymers consisting essentially of the reaction product of:

(a) a vinyl lactam;
   (b) an amino alkyl acrylamide or acrylate,
   (c) optionally, a polymerizable carboxylic acid, and
   (d) 0.1-0.8% by weight of a crosslinking agent, which polymer is represented by the formula:

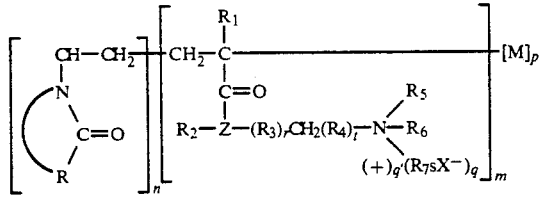

where R is alkylene having from 3 to 8 carbon atoms; $R_1$ and $R_2$ are each independently hyrogen or methyl; $R_3$ and $R_4$ are each alkylene having from 1 to 18 carbon atoms optionally substituted with alkyl; the sum of r and t is one or zero; $R_5$ and $R_6$ are each independently lower alkyl; Z is oxygen or nitrogen; if oxygen, $R_2$ is absent; M is a polymerizable carboxylic acid; n has a value of from 1 to 99 mole %; m has a value of from 1 to 99 mole %, p has a value of from 0 to 98 mole %; the sum of m+n+p is 100 mole %, preferably n is 50 to 90 mole %; m is 7 to 25 mole % and p 3 to 25 mole %; $R_7sX^-$ is a quaternizing group, in which $R_7$ is lower alkyl, pyrrolidonyl alkyl, carboxymethylene, or a zwitterion of β-propiolactone; X is an anion derived from the group of halogen, $SO_3$, $SO_4$, $HSO_4$ and $R_7SO_4$; and s is the reciprocal of the number of negative charges in X; and q and q' ranges from 0.01 to 1, wherein the polymer includes from 1 to 100% of a quaternized form of monomer, wherein the polymer has an aqueous gel volume at a concentration of 1-10% by weight of about 50 to about 150 ml/g and a Brookfield viscosity at an aqueous concentration about 4% by weight of about 10,000 to about 57,000 cps.

2. The product of claim 1 wherein R is alkylene having 3 to 5 carbon atoms.

3. The product of claim 1 wherein the amino alkyl acrylamide moiety has the formula:

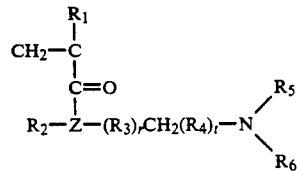

wherein $R_1$, $R_2$, $R_3$, r, $R_4$, t, $R_5$ and $R_6$ are as defined in claim 1.

4. The product of claim 3 wherein the amino alkyl acrylamide is selected from the group consisting of:
   N-[3-(dimethylamino) propyl]methacrylamide;
   N-[12-(dimethylamino) dodecyl]methacrylamide;
   N-[18-(dimethylamino) octadecyl]methacrylamide;
   N-[8-(dimethylamino) octyl]methacrylamide;
   N-[7-(dimethylamino) heptyl]acrylamide;
   N-[14-(dimethylamino) tetradecyl]acrylamide;
   N-[3-(dimethylamino) propyl]methacrylamide;
   N-[3-(diethylamino) propyl]acrylamide;
   N-[4-(dipropylamino) butyl]methacrylamide;
   N-[3-(methyl butyl amino) propyl]acrylamide;
   N-(2-[3-(dimethylamino) propyl]ethyl)acrylamide; and
   N-(4-[4-diethylamino) butyl]butyl)acrylamide.

5. The product of claim 1 wherein the amino alkyl acrylate moiety has the formula

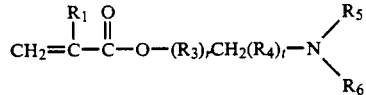

where $R_1$, $R_3$, r, $R_4$, t, $R_5$ and $R_6$ are as defined in claim 2.

6. The product of claim 5 wherein the amino alkyl acrylate is selected from the group consisting of
   dimethylaminomethyl acrylate
   dimethylaminomethyl methacrylate
   diethylaminomethyl acrylate
   diethylaminomethyl methacrylate
   dimethylaminoethyl acrylate
   dimethylaminoethyl methacrylate
   dimethylaminobutyl acrylate
   dimethylaminobutyl methacrylate
   dimethylaminoamyl methacrylate
   diethylaminoamyl methacrylate
   dimethylaminohexyl acrylate
   diethylaminohexyl methacrylate dimethylaminooctyl acrylate
dimethylaminooctyl methacrylate
diethylaminooctyl acrylate
diethylaminooctyl methacrylate
dimethylaminodecyl methacrylate
dimethylaminododecyl methacrylate
diethylaminolauryl acrylate
diethylaminolauryl methacrylate
dimethylaminostearyl acrylate
dimethylaminostearyl methacrylate
diethylaminostearyl acrylate and
diethylaminostearyl methacrylate.

7. The product of claim 1 wherein the polymerizable carboxylic acid is derived from the group selected from acrylic acid, methacrylic acid, maleic acid, crotonic acid, 3-phenyl-2-propenic acid, furmaric acid and itaconic acid.

8. The product of claim 1 wherein n is 50 to 90 mole %; m is 7 to 25 mole %; and p is 1 to 25 mole %.

9. A product according to claim 1 which is made by precipitation polymerization in a non-polar organic solvent selected from a cyclic or acyclic aliphatic hydrocarbon solvent.

10. A product according to claim 1 wherein said product is made with a quaternizing agent selected from the group consisting of an alkyl halide, a dialkyl sulfate, chloroacetic acid, β-propiolactone and chloromethyl pyrrolidone.

11. A cationic polymer according to claim 1 which is a strongly swellable, moderately crosslinked polymer consisting essentially of vinyl lactam, about 0.1–0.8% by weight of a crosslinking agent, and a quaternized amino alkyl acrylamide or acrylate, and, optionally, a polymerizable carboxylic acid.

12. A cationic polymer according to claim 11 wherein said quaternized amino alkyl acrylamide is (3-methacrylamidopropyl)trimethylammonium chloride.

13. A cationic polymer composition according to claim 1 wherein said quaternized amino alkyl acrylate is dimethylaminoethyl methacrylate.

14. A cationic polymer according to claim 11 which include about 0.2–0.6% of said crosslinking agent.

15. A cationic polymer according to claim 11 wherein said vinyl lactam is vinyl pyrrolidone.

16. A cationic polymer composition according to claim 11 wherein said carboxylic acid is present in said polymer.

17. A gel solution of the cationic polymer of claim 11 in an aqueous or non-aqueous medium, or mixtures thereof.

18. An aqueous gel solution of the cationic polymer of claim 11 in a polymer concentration of 1–10% by weight, which has an aqueous gel volume of 50 to 150 ml/g and a Brookfield viscosity of 10,000 to 57,000 cps at a polymer concentration of about 4% by weight.

19. An aqueous solution of the cationic polymer composition of claim 14 at a polymer concentration of 3 to 5% by weight, which has a gel volume of 70 to 90 ml/g and a Brookfield viscosity of 23,000 to 57,000 cps.

20. A cationic polymer according to claim 11 in which said crosslinking agent is selected from N,N'-divinylimidazolidone, pentaerythritol triallyl ether and triallyl-1,3,5-triazine-2,4,6(1H,3H,5H)-trione.

* * * * *